US012469976B2

(12) United States Patent
Hsieh et al.

(10) Patent No.: US 12,469,976 B2
(45) Date of Patent: Nov. 11, 2025

(54) ANTENNA DEVICE

(71) Applicant: Innolux Corporation, Miaoli County (TW)

(72) Inventors: Chih-Yung Hsieh, Miaoli County (TW); Hong-Sheng Hsieh, Miaoli County (TW); Yan-Zheng Wu, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 201 days.

(21) Appl. No.: 18/346,882

(22) Filed: Jul. 5, 2023

(65) Prior Publication Data

US 2024/0047882 A1 Feb. 8, 2024

Related U.S. Application Data

(60) Provisional application No. 63/394,977, filed on Aug. 4, 2022.

(30) Foreign Application Priority Data

Apr. 17, 2023 (CN) ........................ 202310408521.X

(51) Int. Cl.
*H01Q 1/48* (2006.01)
*H01Q 9/04* (2006.01)
*H01Q 21/06* (2006.01)

(52) U.S. Cl.
CPC ............. *H01Q 9/0414* (2013.01); *H01Q 1/48* (2013.01); *H01Q 21/065* (2013.01)

(58) Field of Classification Search
CPC ....... H01Q 9/0414; H01Q 1/48; H01Q 21/065
See application file for complete search history.

(56) References Cited

FOREIGN PATENT DOCUMENTS

| | | | |
|---|---|---|---|
| CN | 110574236 | 8/2021 | |
| CN | 113675234 A * | 11/2021 | ........... H10H 29/142 |

* cited by examiner

*Primary Examiner* — Henry Luong
(74) *Attorney, Agent, or Firm* — JCIPRNET

(57) ABSTRACT

An antenna device includes a first grid layer, a second grid layer, and a first insulation layer. The first grid layer has a first function region. The second grid layer has a second function region and a second dummy region electrically insulated from the second function region. The first insulation layer is disposed between the first grid layer and the second grid layer, and the first function region overlaps the second function region.

18 Claims, 10 Drawing Sheets

ANTENNA DEVICE

CROSS-REFERENCE TO RELATED APPLICATION

This application claims the priority benefits of U.S. provisional application Ser. No. 63/394,977, filed on Aug. 4, 2022, and China application serial no. 202310408521.X, filed on Apr. 17, 2023. The entirety of each of the above-mentioned patent application is hereby incorporated by reference herein and made a part of this specification.

BACKGROUND

Technical Field

The disclosure relates to an electronic device, and in particular, to an antenna device.

Description of Related Art

In existing antenna devices, there are different conduction patterns designed in various positions, which results in light transmittances being different in various regions, thereby affecting the appearance quality of the antenna device.

SUMMARY

The disclosure provides an antenna device, which helps to improve appearance quality.

According to an embodiment of the disclosure, an antenna device includes a first grid layer, a second grid layer, and a first insulation layer. The first grid layer has a first function region. The second grid layer has a second function region and a second dummy region electrically insulated from the second function region. The first insulation layer is disposed between the first grid layer and the second grid layer, and the first function region overlaps the second function region.

According to another embodiment of the disclosure, an antenna device includes a first grid layer, a second grid layer, and a third grid layer. The first grid layer includes a first function region. The first function region includes a first pattern. The second grid layer is disposed on the first grid layer and includes a second function region. The second function region overlaps the first function region and includes a second pattern. The third grid layer is disposed on the second grid layer and includes a third function region. The third function region overlaps the second function region and includes a third pattern. The third pattern is the same as the first pattern.

In order to make the above-mentioned features and advantages of the disclosure clearer and easier to understand, the following embodiments are given and described in details with accompanying drawings as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
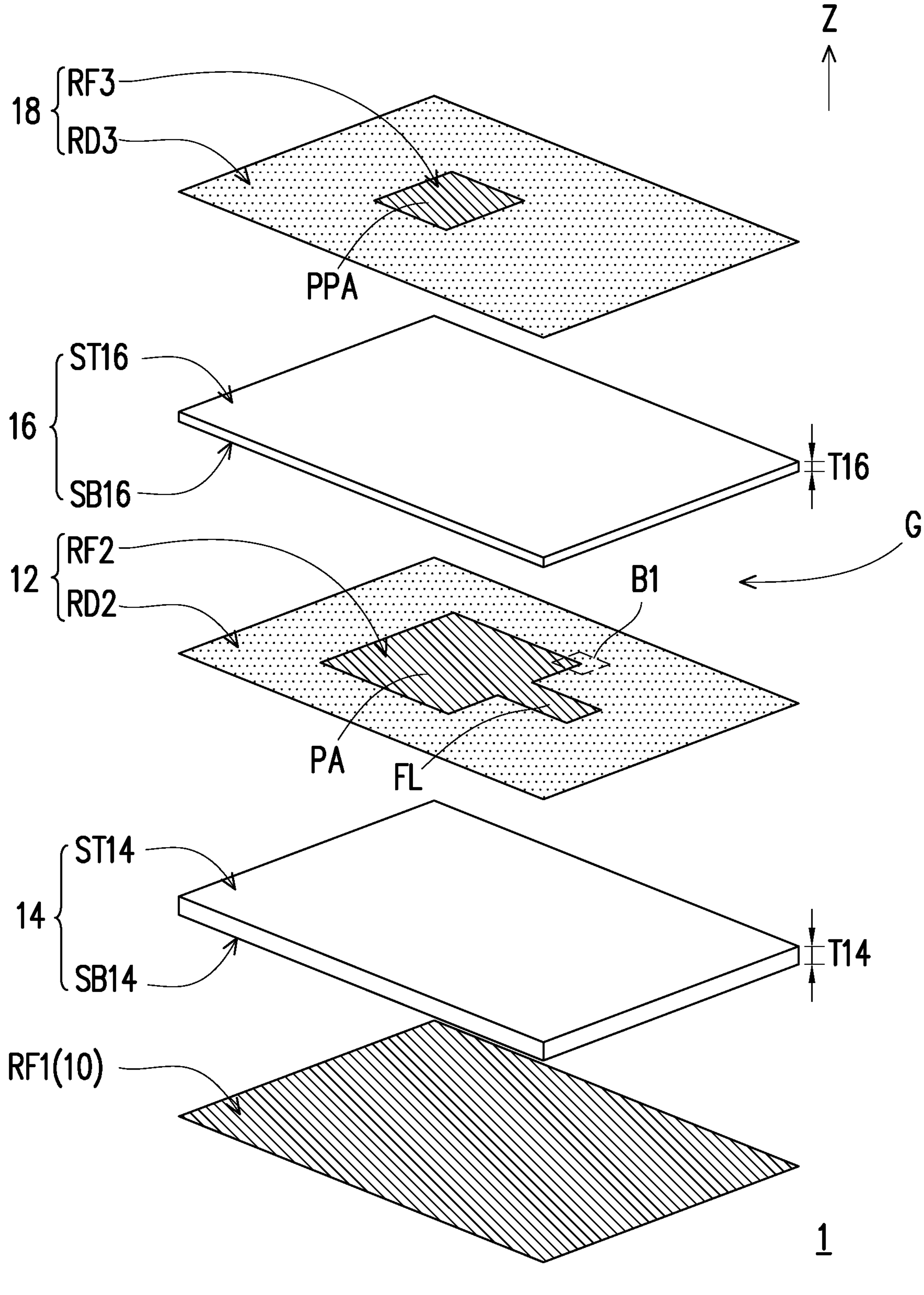
FIG. 1, FIG. 3, FIG. 4, FIG. 5, FIG. 6, and FIG. 11 are respective exploded diagrams of various antenna devices according to different embodiments of the disclosure.

The disclosure can be understood by referring to the following detailed description in combination with the accompanying drawings. It should be noted that in order to make it easy for the reader to understand and for the simplicity of the drawings, the multiple drawings in this disclosure only depict a part of the electronic device, and the specific elements in the drawings are not drawn according to actual scale. In addition, the quantity and size of each element in the drawings are only for exemplary purpose, and are not intended to limit the scope of the disclosure. For example, the relative sizes, thicknesses, and positions of layers, regions, or structures may be reduced or exaggerated for clarity.

Throughout the disclosure, certain terms are used to refer to specific elements in the specification and the claims. Those skilled in the art should understand that electronic device manufacturers may refer to the same elements by different names. The present specification does not intend to distinguish between elements that have the same function but different names. In the following specification and claims, words such as “comprising”, “including”, and “having” are open-ended words, and thus they should be interpreted as meaning “including but not limited to . . . ”.

Directional terms, such as “upper”, “lower”, “front”, “rear”, “left”, “right”, mentioned in the disclosure are only directions with reference to the drawings. Therefore, the used directional terms are used to illustrate, but not to limit, the disclosure. It should be understood that when an element or a film layer is referred to as being “disposed on” or “connected to” another element or film layer, the element or the film layer may be either directly on the other element or film layer or be directly connected to the other element or film layer, or there is an intervening element or film layer present in between (indirect connection). In contrast, when an element or a film layer is referred to as being “directly on” or “directly connected to” another element or film layer, there are no intervening elements or film layers present in between.

The terms “about”, “substantially”, or “approximately” mentioned herein are generally interpreted as being within 10% of a given value or range, or interpreted as within 5%, 3%, 2%, 1%, or 0.5% of a given value or range. In addition, unless otherwise specified, the terms wherein “the given range is from a first value to a second value” and “the given range is within the range from a first value to a second value” all mean that the given range includes the first value, the second value, and other values in between.

In some embodiments of the disclosure, terms such as “connection” and “interconnection” related to bonding and connection, unless otherwise specified, may mean that two structures are in direct contact, or may also mean that two structures are not in direct contact and that there are other structures located between these two structures. The terms about bonding and connecting may also include the case where both structures are movable, or both structures are fixed.

In addition, the term "electrically connected" may include any direct or indirect electrical connection means. For example, "direct electrical connection" may mean that two elements are in direct contact and electrically connected, or that two elements may be connected in series through one or more conduction elements; "indirect electrical connection" may mean that two elements are separated from each other, and there is no other conduction element between the two elements to connect them in series.

In the following embodiments, the same or similar elements use the same or similar referential numbers, and redundant description thereof is omitted. In addition, as long as the features of the various embodiments do not violate the spirit of the disclosure or conflict with one another, they may be mixed and matched arbitrarily, and simple equivalent changes and modifications made in accordance with the specification or claims may still fall within the scope of the disclosure. In addition, terms such as "first" and "second" mentioned in the specification or claims are only used to name different elements or to distinguish different embodiments or ranges, and are not used to limit the upper limit or lower limit of the number of elements, nor are the terms intended to limit the manufacturing sequence or arrangement sequence of elements.

An electronic device of the disclosure may include a display device, a backlight device, a radio frequency device, a sensing device, or a splicing device, but is not limited thereto. The electronic device may be a bendable or flexible electronic device. The display device may be a non-self-luminous display device or a self-luminous display device. The radio frequency device may include a frequency selective surface (FSS), an electromagnetic band gap (EBG) structure, a RF-Filter, a polarizer, a resonator, or an antenna and so on. The antenna may be a liquid crystal type antenna or a non-liquid crystal type antenna. The sensing device may be a sensing device for sensing capacitance, light, heat, or ultrasonic, but is not limited thereto. The splicing device may be, for example, a display splicing device or a radio frequency splicing device, but is not limited thereto. It should be noted that any permutation and combination of the foregoing may be possible, but is not limited thereto.

Figure 8:
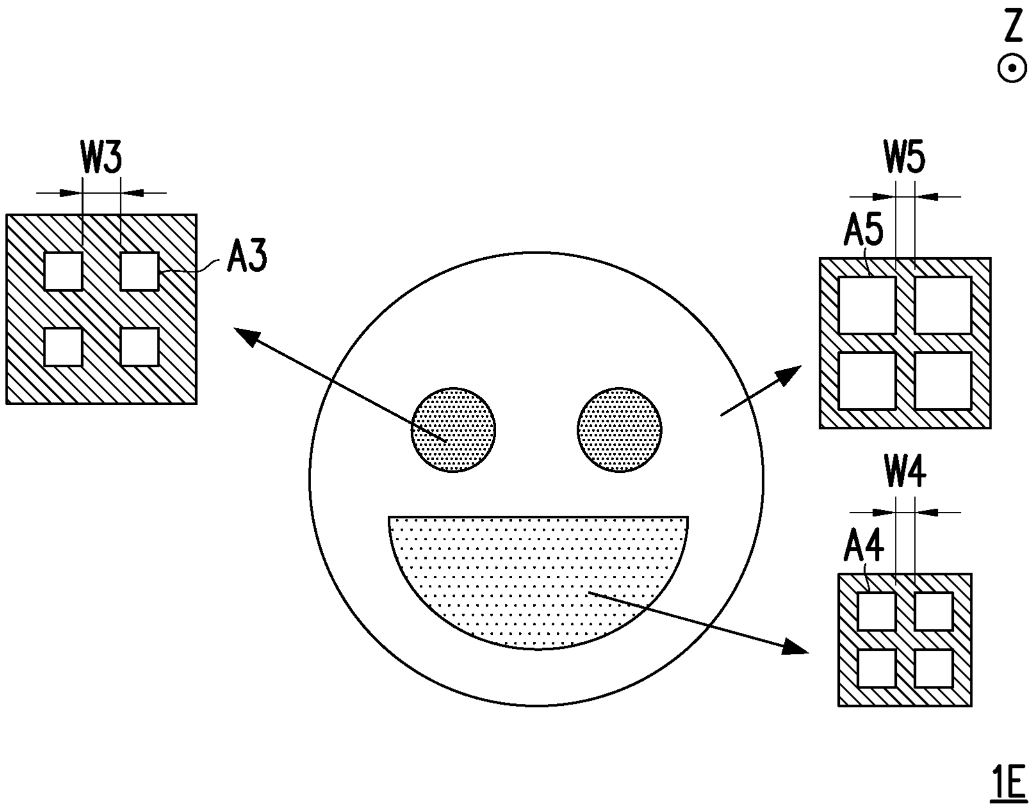
FIG. 8 and FIG. 9 are schematic partial top-view diagrams of various antenna devices according to different embodiments of the disclosure.
Figure 9:
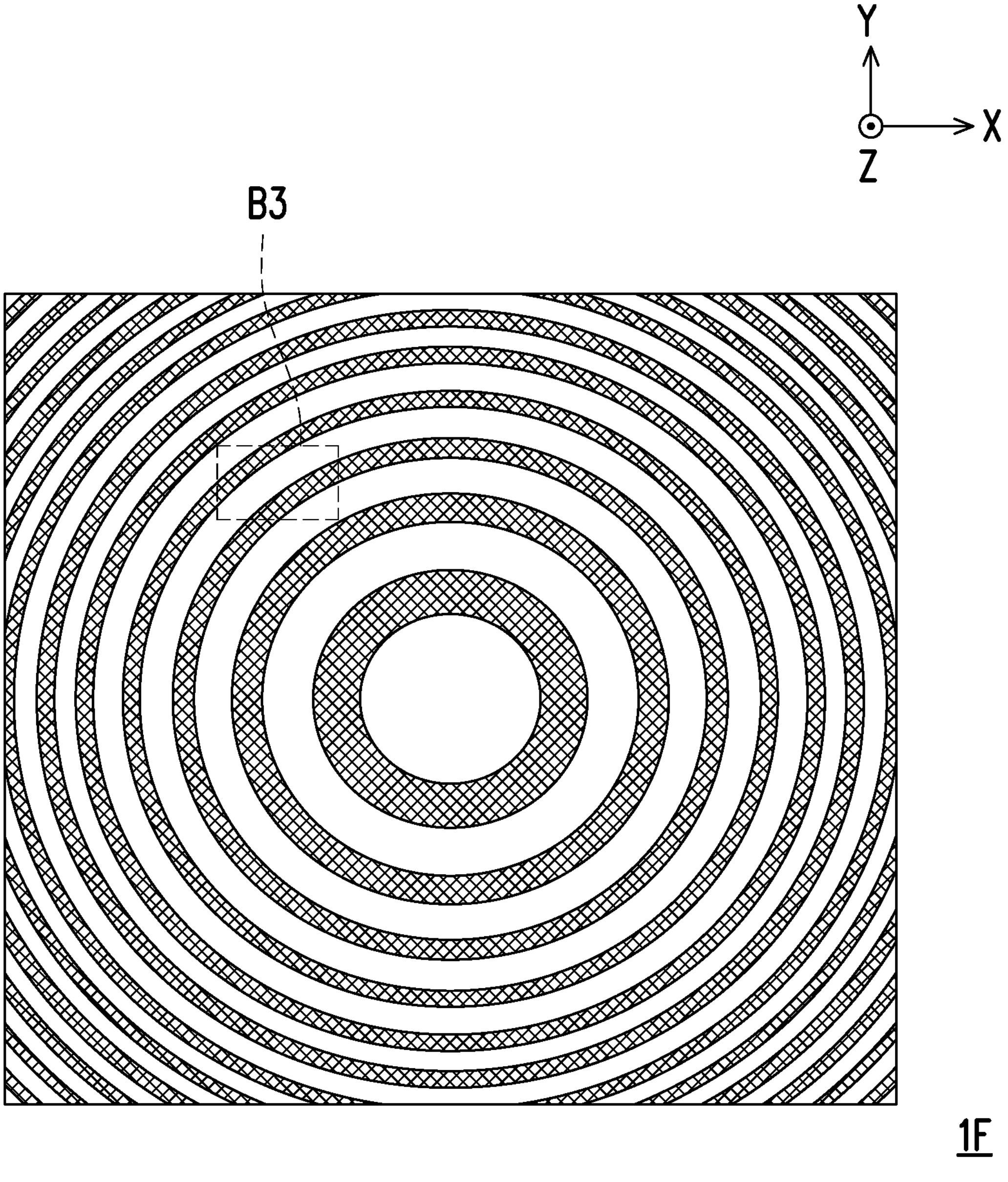
Figure 10:
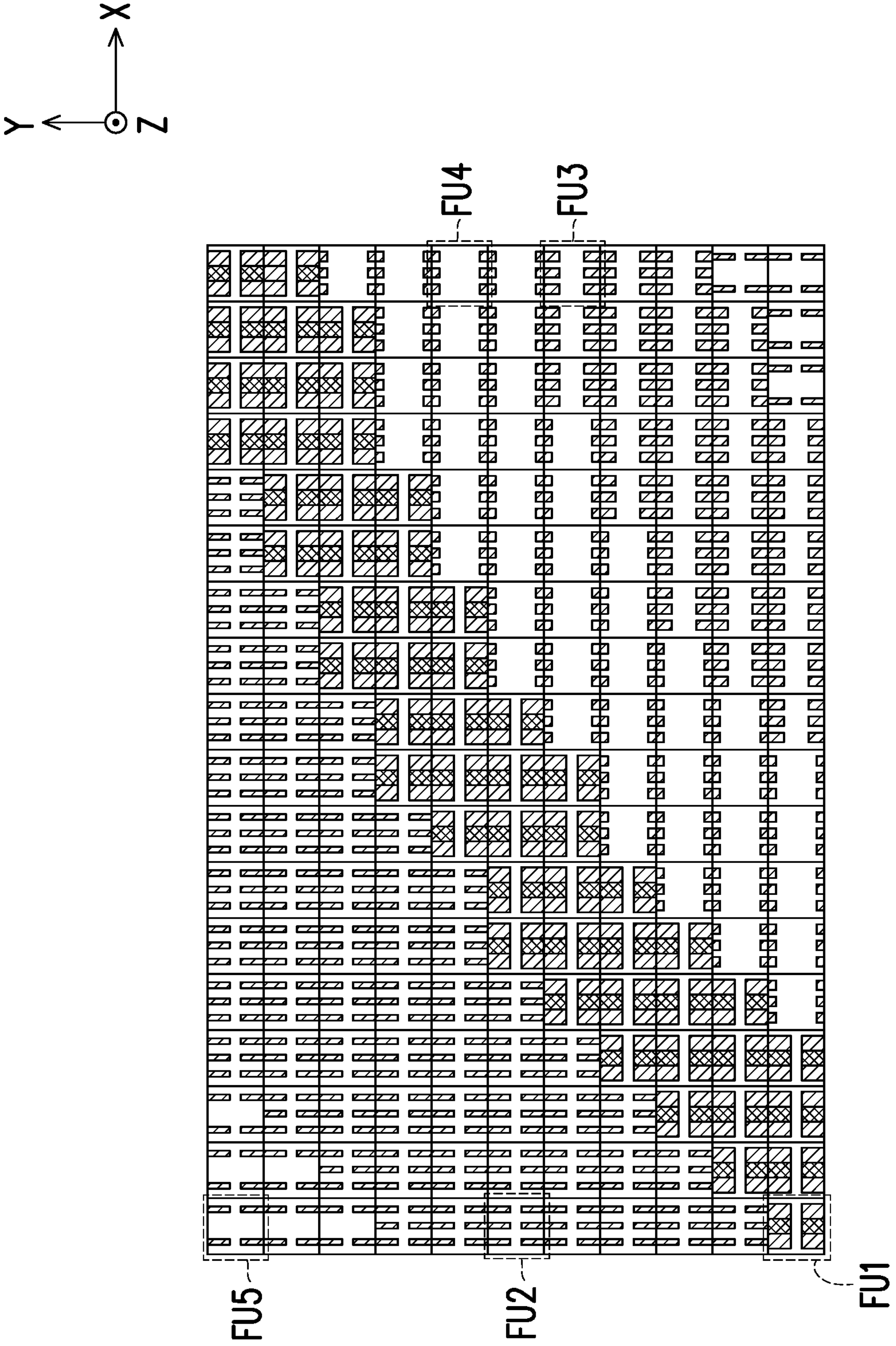
FIG. 10 is a schematic top-view diagram of a dotted frame B3 in FIG. 9.

FIG. 1, FIG. 3, FIG. 4, FIG. 5, FIG. 6, and FIG. 11 are respective exploded diagrams of various antenna devices according to different embodiments of the disclosure. FIG. 2A to FIG. 2D are various schematic top-view diagrams of a dotted frame B1 in FIG. 1. FIG. 7 is a schematic top-view diagram of a dotted frame B2 in FIG. 6. FIG. 8 and FIG. 9 are schematic partial top-view diagrams of various antenna devices according to different embodiments of the disclosure. FIG. 10 is a schematic top-view diagram of a dotted frame B3 in FIG. 9.

Referring to FIG. 1, an antenna device 1 may include a first grid layer 10, a second grid layer 12, and a first insulation layer 14. The first grid layer 10 has a first function region RF1. The second grid layer 12 has a second function region RF2 and a second dummy region RD2 electrically insulated from the second function region RF2. The first insulation layer 14 is disposed between the first grid layer 10 and the second grid layer 12, and the first function region RF1 overlaps the second function region RF2.

Herein, the grid layer generally refers to a film layer having multiple grid openings. The top-view shape of the grid opening is not limited. For example, the top-view shape of the grid opening may be a triangle, a quadrangle, other polygons, a circle, an ellipse, other polygons, an irregular shape, or a combination thereof. In some embodiments, the grid opening may be filled with an insulation material with a low dissipation factor (Df); alternatively, the grid opening may not be filled with any material. In other words, the grid opening is filled with gas (e.g., atmospheric air, nitrogen) or vacuum, but is not limited thereto.

For the sake of brevity of the drawings, multiple grid openings in each grid layer are not shown in FIG. 1, but different regions of each grid layer (such as function regions and dummy regions) are only distinguished by different grid shadow regions. However, it should be understood that the different regions in the same grid layer may each have multiple grid openings, and the multiple grid openings in the different regions may have the same or different top-view shapes. In addition, although the multiple function regions in the different grid layers are represented by the same grid shadows (such as diagonal lines) in FIG. 1, and the multiple dummy regions in the different grid layers are represented by the same grid shadows (such as grid dots), the multiple grid openings in the multiple function regions may have the same or different top-view shapes, and the multiple grid openings in the multiple dummy regions may have the same or different top-view shapes.

Herein, the multiple function regions may be used to control radio frequency parameters of electromagnetic waves (such as the radiation intensity, the resonant frequency, or the phase) or to adjust transmission directions of electromagnetic waves. For example, each of the multiple function regions may include a conduction layer having multiple grid openings. By controlling the voltage supplied to the conduction layer (such as the ground voltage, the DC voltage, or the AC voltage) and/or controlling the voltage supplied to an electronic element electrically connected to any of the conduction layers (not shown; such as the active element, the passive element, or a combination of the above), the phase and the amplitude of the electromagnetic wave change accordingly, such that the direction of the electromagnetic wave may be controlled or the directivity of the antenna device 1 may be improved. The material of the conduction layer may include metal, alloy, or a combination thereof, but is not limited thereto. The electromagnetic wave may include a planar wave, a cylindrical wave, or a spherical wave, but is not limited thereto. The frequency range of the electromagnetic wave may be radio frequency, millimeter wave, or Terahertz wave (THz), etc., but is not limited thereto. The transmission medium of the electromagnetic wave may include a transmission line, a waveguide structure, or a free space, but is not limited thereto.

Herein, the multiple dummy regions may be used to enhance the visual effect. For example, each of the dummy regions may include a conduction layer having multiple grid openings or an insulation layer having multiple grid openings. The material of the conduction layer may include metal, alloy, or a combination thereof, but is not limited thereto. The material of the insulation layer may include an organic insulation layer, an inorganic insulation layer, or a combination thereof.

When the multiple grid openings in the function region and the dummy region in the same grid layer are all made of conduction materials, the multiple grid openings in the dummy region and the multiple grid openings in the function region may be separated, so that the dummy region and the function region are electrically insulated. On the other hand, when the multiple grid openings in the function region and the dummy region in the same grid layer are made of conduction materials and insulation materials respectively, the multiple grid openings in the dummy region and the multiple grid openings in the function region may be separated or be in contact. For details, please refer to the related description of FIG. 2A to FIG. 2D.

By disposing the multiple grid openings in regions outside the function region, the difference in the light transmittances and/or the reflectances between the function region and the dummy region may be reduced, which helps to improve the appearance of the antenna device 1.

In detail, in FIG. 1, the first grid layer 10 is, for example, disposed on a lower surface SB14 of the first insulation layer 14. The first function region RF1 of the first grid layer 10 completely covers the lower surface SB14 of the first insulation layer 14, and the first grid layer 10 does not include a dummy region.

The second grid layer 12 is, for example, disposed on an upper surface ST14 of the first insulation layer 14. The second function region RF2 of the second grid layer 12 partially covers the upper surface ST14 of the first insulation layer 14, and the second dummy region RD2 of the second grid layer 12 covers the upper surface ST14 not covered by the second function region RF2. The second function region RF2 includes, for example, a patch antenna PA and a feed line FL, but is not limited thereto. In addition, the second function region RF2 overlaps the first function region RF1. For example, the second function region RF2 at least partially overlaps the first function region RF1 in a thickness direction (such as a direction Z) of the antenna device 1.

The first insulation layer 14 is disposed between the first grid layer 10 and the second grid layer 12 such that the first grid layer 10 and the second grid layer 12 are electrically insulated from each other. The first insulation layer 14 may be used to carry the first grid layer 10 and the second grid layer 12. In some embodiments, the first insulation layer 14 may also serve as a waveguide structure for transmitting electromagnetic waves, but is not limited thereto. In other embodiments, the waveguide structure may be replaced by a transmission line or free space. The first insulation layer 14 may be a rigid substrate or a flexible substrate. For example, the material of the first insulation layer 14 may include glass, polymer (such as polyimide), printed circuit board (such as glass fiber), or a combination thereof, but is not limited thereto.

In some embodiments, the antenna device 1 may further include a second insulation layer 16 and a third grid layer 18. The second insulation layer 16 is disposed on the second grid layer 12. The third grid layer 18 is disposed on the second insulation layer 16 and has a third function region RF3 and a third dummy region RD3 electrically insulated from the third function region RF3. The third function region RF3 overlaps the second function region RF2.

In detail, the second insulation layer 16 is disposed between the second grid layer 12 and the third grid layer 18 such that the second grid layer 12 and the third grid layer 18 are electrically insulated from each other. The second insulation layer 16 may be used to carry the third grid layer 18, and the second insulation layer 16 may be a rigid substrate or a flexible substrate. For example, the material of the second insulation layer 16 may include glass, polymer (such as polyimide), printed circuit board (such as glass fiber), or a combination thereof, but is not limited thereto.

The second insulation layer 16 has an upper surface ST16 and a lower surface SB16. The lower surface SB16 and the upper surface ST16 are opposite to each other, and the lower surface SB16 is, for example, located between the upper surface ST16 and the second grid layer 12. In some embodiments, there may be a gap G between the lower surface SB16 and the second grid layer 12. The electromagnetic wave transmission medium in the gap G may include air, but is not limited thereto.

The third grid layer 18 is, for example, disposed on the upper surface ST16 of the second insulation layer 16. The third function region RF3 of the third grid layer 18 partially covers the upper surface ST16 of the second insulation layer 16, and the third dummy region RD3 of the third grid layer 18 covers the upper surface ST16 not covered by the third function region RF3. The third function region RF3 includes, for example, a parasitic patch antenna (PPA), but is not limited thereto. In addition, the third function region RF3 at least partially overlaps the second function region RF2 in the thickness direction (such as the direction Z) of the antenna device 1.

In some embodiments, the first function region RF1 is, for example, connected to a ground signal (that is, the first function region RF1 includes a ground electrode), the second function region RF2 may receive electrical signals to modulate the radio frequency parameters of the electromagnetic waves (such as radiation intensity, resonant frequency, or phase), and the third function region RF3 may gain bandwidth, but is not limited thereto. In some embodiments, although not shown, the first insulation layer 14 may include a tunable element to adjust the electrical signal received by the second function region RF2. Under this framework, a thickness T14 of the first insulation layer 14 is greater than a thickness T16 of the second insulation layer 16, for example. For the purpose of illustration, FIG. 1 only schematically shows the thickness T14 of the first insulation layer 14 and the thickness T16 of the second insulation layer 16, but it should be understood that the first grid layer 10, the second grid layer 12, and the third grid layer 18 also have thicknesses (not shown).

The tunable element may include a variable capacitor, a variable resistor, a variable inductor, a diode, a transistor, an MEMS, or a combination thereof. The relevant parameters of the tunable element may be modulated by the signal applied to the tunable element. The relevant parameters may include, for example, a dielectric constant, a region, a semiconductor depletion region width, or a metal plate height, but are not limited thereto. In some embodiments, the tunable element may be packaged in a panel level package (PLP), a wafer level package (WLP), or a fan-out wafer level package (FOWLP)) and other technologies to package the tunable elements. In some embodiments, the tunable element may be bonded to one or more corresponding conduction patterns and/or signal lines by direct bonding, microbonding, or flip-chip bonding.

Several implementation forms of the function region and the dummy region are described below with reference to FIG. 2A to FIG. 2D, but it should be understood that the implementation forms of the function region and the dummy region disclosed in the disclosure are not limited thereto. In addition, although FIG. 2A to FIG. 2D are only described for the second function region RF2 and the second dummy region RD2, other function regions and other dummy regions of the antenna device may be deduced similarly and so are not be repeated below.

Figure 2A:
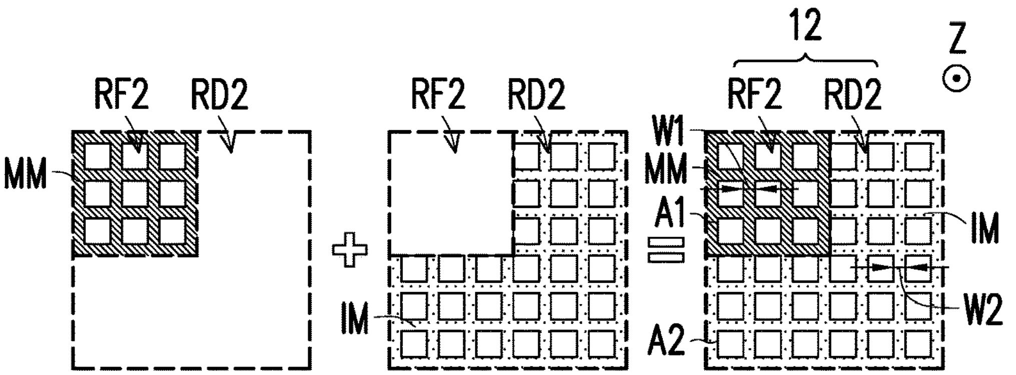
FIG. 2A to FIG. 2D are various schematic top-view diagrams of a dotted frame B1 in FIG. 1.

Referring to FIG. 2A, the grid layer (such as the second grid layer 12) may include a conduction layer MM having multiple grid openings A1 and an insulation layer IM having multiple grid openings A2. The conduction layer MM with the multiple grid openings A1 is disposed in the function region (such as the second function region RF2), the insulation layer IM with the multiple grid openings A2 is disposed in the dummy region (such as the second dummy region RD2), and the conduction layer MM and the insulation layer IM may be in contact with each other, but are not limited thereto. For example, although not shown, the conduction layer MM and the insulation layer IM may be separated from each other. For example, the conduction layer MM and the insulation layer IM may be separated at the junction of the function region (such as the second function region RF2) and the dummy region (such as the second dummy region RD2).

The grid opening A1 and the grid opening A2 may have the same or different top-view shapes, the same or different sizes, and the same or different line widths (such as a line width W1 and a line width W2). In some embodiments, by selecting appropriate materials (such as selecting materials with a specific light transmittance or reflectance) or by changing the shape, the size, the line width, or the density of the grid opening, the difference in the light transmittances and/or the reflectances between the function region and the dummy region may be further reduced. For example, the difference in the light transmittances between the function region and the dummy region may be less than 5%, but is not limited thereto. The following embodiments may be changed in accordance with the description of the paragraph and so are not repeated below.

Figure 2B:
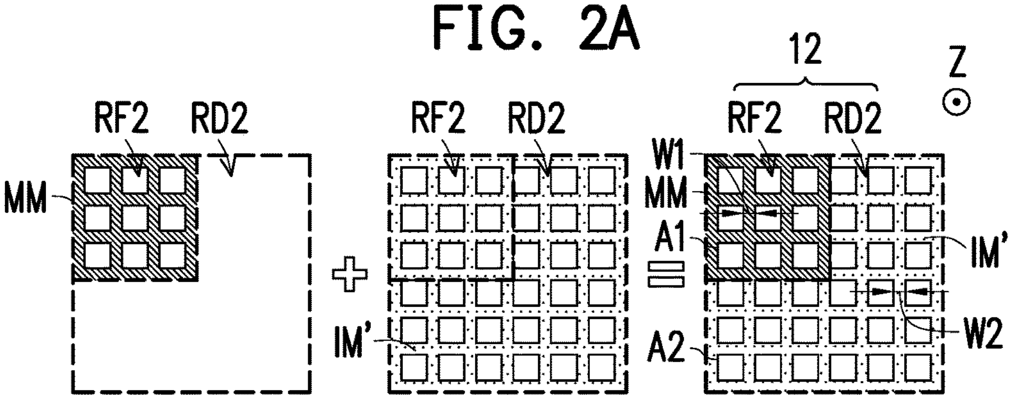

Referring to FIG. 2B, the grid layer (such as the second grid layer 12) may include the conduction layer MM having the multiple grid openings A1 and an insulation layer IM' having the multiple grid openings A2. The conduction layer MM with the multiple grid openings A1 is disposed in the function region (such as the second function region RF2), the insulation layer IM' with the multiple grid openings A2 is disposed in the dummy region (such as the second dummy region RD2) and the function region (such as the second function region RF2), and the conduction layer MM and the insulation layer IM' overlap each other and may be in contact with each other in the function region (such as the second function region RF2).

Figure 2C:
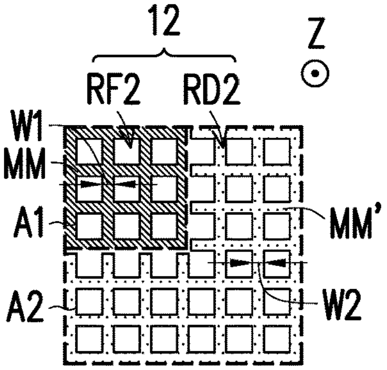

Referring to FIG. 2C, the grid layer (such as the second grid layer 12) may include the conduction layer MM having the multiple grid openings A1 and a conduction layer MM' having the multiple grid openings A2. The conduction layer MM with the multiple grid openings A1 is disposed in the function region (such as the second function region RF2), the conduction layer MM' with the multiple grid openings A2 is disposed in the dummy region (such as the second dummy region RD2), and the conduction layer MM and the conduction layer MM' are separated at the junction of the function region (such as the second function region RF2) and the dummy region (such as the second dummy region RD2). The conduction layer MM' may be a floating electrode layer, but is not limited thereto.

Figure 2D:
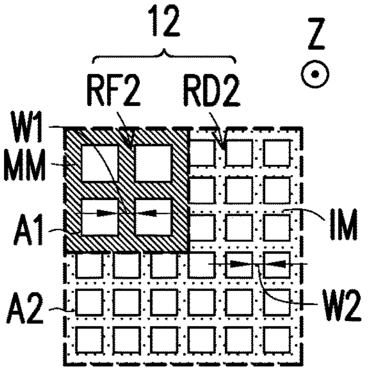

Referring to FIG. 2D, the grid layer (such as the second grid layer 12) may include the conduction layer MM having the multiple grid openings A1 and the insulation layer IM having the multiple grid openings A2. The conduction layer MM with the multiple grid openings A1 is disposed in the function region (such as the second function region RF2), the insulation layer IM with the multiple grid openings A2 is disposed in the dummy region (such as the second dummy region RD2), and the size and the line width W1 of the grid opening A1 are, for example, greater than the size and the line width W2 of the grid opening A2, so that the difference in the light transmittances and/or the reflectances between the function region (such as the second function region RF2) and the dummy region (such as the second dummy region RD2) is less than 5%.

By reducing the difference in the transmittances and/or the reflectances between the function region and the dummy region, the visibility of the antenna pattern (function region pattern) may be reduced, so that the antenna device may be applied in windows, glass doors, or other devices.

Figure 3:
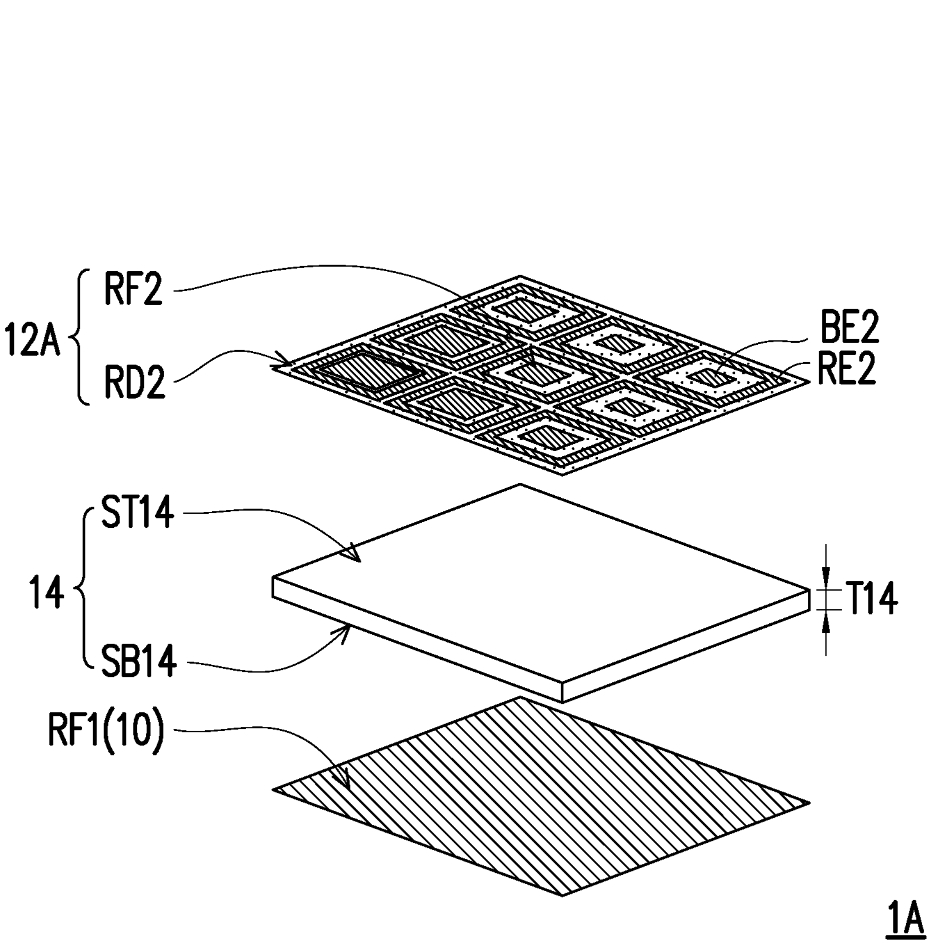

Referring to FIG. 3, an antenna device 1A is, for example, a reflective antenna array and includes the first grid layer 10, a second grid layer 12A, and the first insulation layer 14. The main difference between the second grid layer 12A and the second grid layer 12 of FIG. 1 is that the second function region RF2 includes multiple ring-shaped electrodes RE2 and multiple block-shaped electrodes BE2. The multiple ring-shaped electrodes RE2 are arranged in an array on a plane perpendicular to the direction Z, and the multiple block-shaped electrodes BE2 are located in the multiple ring-shaped electrodes RE2, respectively.

The top-view shapes of the multiple ring-shaped electrodes RE2 and the multiple block-shaped electrodes BE2 may be designed according to requirements and are not limited to the top-view shapes shown in FIG. 3. For example, the top-view shapes of the multiple ring-shaped electrodes RE2 may be other polygonal frame shapes, circular rings, oval rings, or other irregular ring shapes, while the top-view shapes of the multiple block-shaped electrodes BE2 may be other polygonal, circular, oval, or other irregular shapes. In some embodiments, the first function region RF1 is connected to a ground signal, for example, and the second function region RF2 may receive the electrical signals to modulate the radio frequency parameters (such as the radiation intensity, the resonance frequency, or the phase) of the electromagnetic waves. In addition, by controlling the sizes of the multiple block-shaped electrodes BE2, the phase and the amplitude of the electromagnetic wave change accordingly (that is, the phase and/or the amplitude of the electromagnetic wave incident on the antenna device 1A is different from the phase and/or the amplitude of the electromagnetic wave reflected by the antenna device 1A), such that the direction of the electromagnetic wave reflected by the antenna device 1A may be controlled or the directivity of the antenna device 1A may be improved.

Although not shown in FIG. 3, each ring-shaped electrode RE2 and each block-shaped electrode BE2 in the second function region RF2 may have multiple grid openings A1. For example, please refer to the design of the conduction layer MM in FIG. 2A to FIG. 2D. In addition, the second dummy region RD2 (the region outside the multiple ring-shaped electrodes RE2 and the multiple block-shaped electrodes BE2 in the second grid layer 12A) may also have the multiple grid openings A2. For example, please refer to the design of the insulation layer IM, the insulation layer IM', or the conduction layer MM' in FIG. 2A to FIG. 2D and the details are not repeated here.

Figure 4:
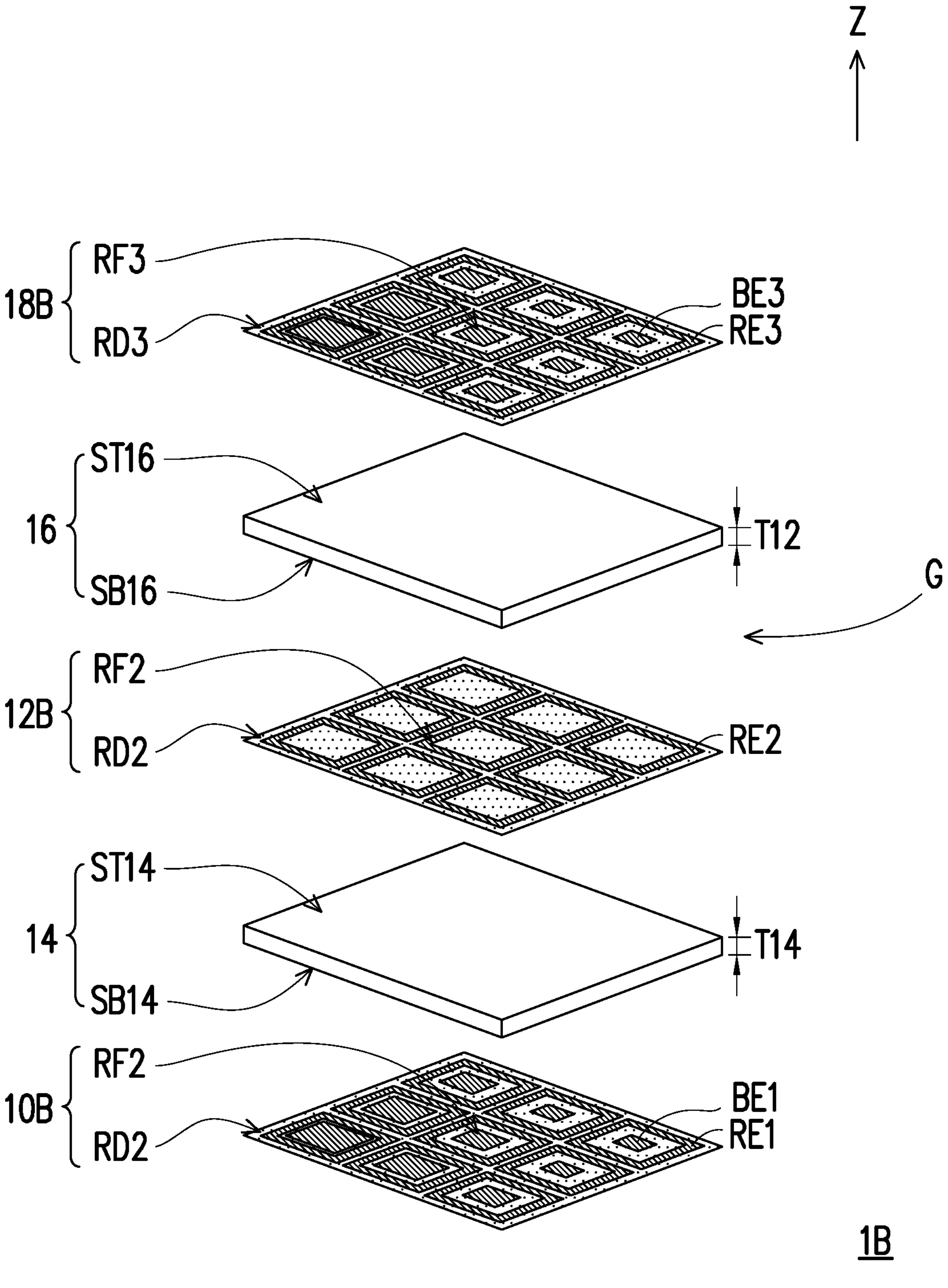

Referring to FIG. 4, an antenna device 1B is, for example, a penetrating antenna array and includes a first grid layer 10B, a second grid layer 12B, the first insulation layer 14, the second insulation layer 16, and a third grid layer 18B. The main difference between the first grid layer 10B and the first grid layer 10 of FIG. 1 is that the first grid layer 10B also has a first dummy region RD1 electrically insulated from the first function region RF1. In addition, the first function region RF1 includes multiple ring-shaped electrodes RE1 and multiple block-shaped electrodes BE1. The multiple ring-shaped electrodes RE1 are arranged in an array on a plane perpendicular to the direction Z, and the multiple block-shaped electrodes BE1 are located in the multiple ring-shaped electrodes RE1, respectively.

The main difference between the second grid layer 12B and the second grid layer 12 of FIG. 1 is that the second function region RF2 includes the multiple ring-shaped electrodes RE2. The multiple ring-shaped electrodes RE2 are arranged in an array on a plane perpendicular to the direction Z and overlap the multiple ring-shaped electrodes RE1 in the direction Z.

The main difference between the third grid layer 18B and the third grid layer 18 of FIG. 1 is that the third function region RF3 includes multiple ring-shaped electrodes RE3 and multiple block-shaped electrodes BE3. The multiple ring-shaped electrodes RE3 are arranged in an array on a plane perpendicular to the direction Z and overlap the multiple ring-shaped electrodes RE2 in the direction Z, and the multiple block-shaped electrodes BE3 are located in the multiple ring-shaped electrodes RE3, respectively.

The top-view shapes of the multiple ring-shaped electrodes (including the multiple ring-shaped electrodes RE1, the multiple ring-shaped electrodes RE2, and the multiple ring-shaped electrodes RE3) and the multiple block-shaped electrodes (including the multiple block-shaped electrodes BE1 and the multiple block-shaped electrodes BE3) may be designed according to requirements and is not limited to the top-view shapes shown in FIG. 4. For example, the top-view shapes of the multiple ring-shaped electrodes may be other polygonal frame shapes, circular rings, oval rings, or other irregular ring shapes, and the top-view shapes of the multiple block-shaped electrodes may be other polygonal, circular, oval, or other irregular shapes. In addition, the multiple ring-shaped electrodes on the different grid layers may have the same or different top-view shapes, and the multiple block-shaped electrodes on the different grid layers may have the same or different top-view shapes. By controlling the sizes of the multiple block-shaped electrodes, the phase and the amplitude of the electromagnetic wave change accordingly (that is, the phase and/or the amplitude of the electromagnetic wave incident on the antenna device 1B is different from the phase and/or the amplitude of the electromagnetic wave penetrating the antenna device 1B), such that the direction of the electromagnetic wave penetrating the antenna device 1B may be controlled or the directivity of the antenna device 1B may be improved.

Although not shown in FIG. 4, each ring-shaped electrode and each block-shaped electrode in the above-mentioned function region may have multiple grid openings. For example, please refer to the design of the conduction layer MM in FIG. 2A to FIG. 2D. In addition, the above-mentioned dummy region (such as the region outside the multiple ring-shaped electrodes RE1 and the multiple block-shaped electrodes BE1 in the first grid layer 10B, the region outside the multiple ring-shaped electrodes RE2 in the second grid layer 12B, and the region outside the multiple ring-shaped electrodes RE3 and the multiple block-shaped electrodes BE3 in the three-grid layer 18B) may also have multiple grid openings. For example, please refer to the design of the insulation layer IM, the insulation layer IM', or the conduction layer MM' in FIG. 2A to FIG. 2D. and the details are not repeated here.

Figure 5:
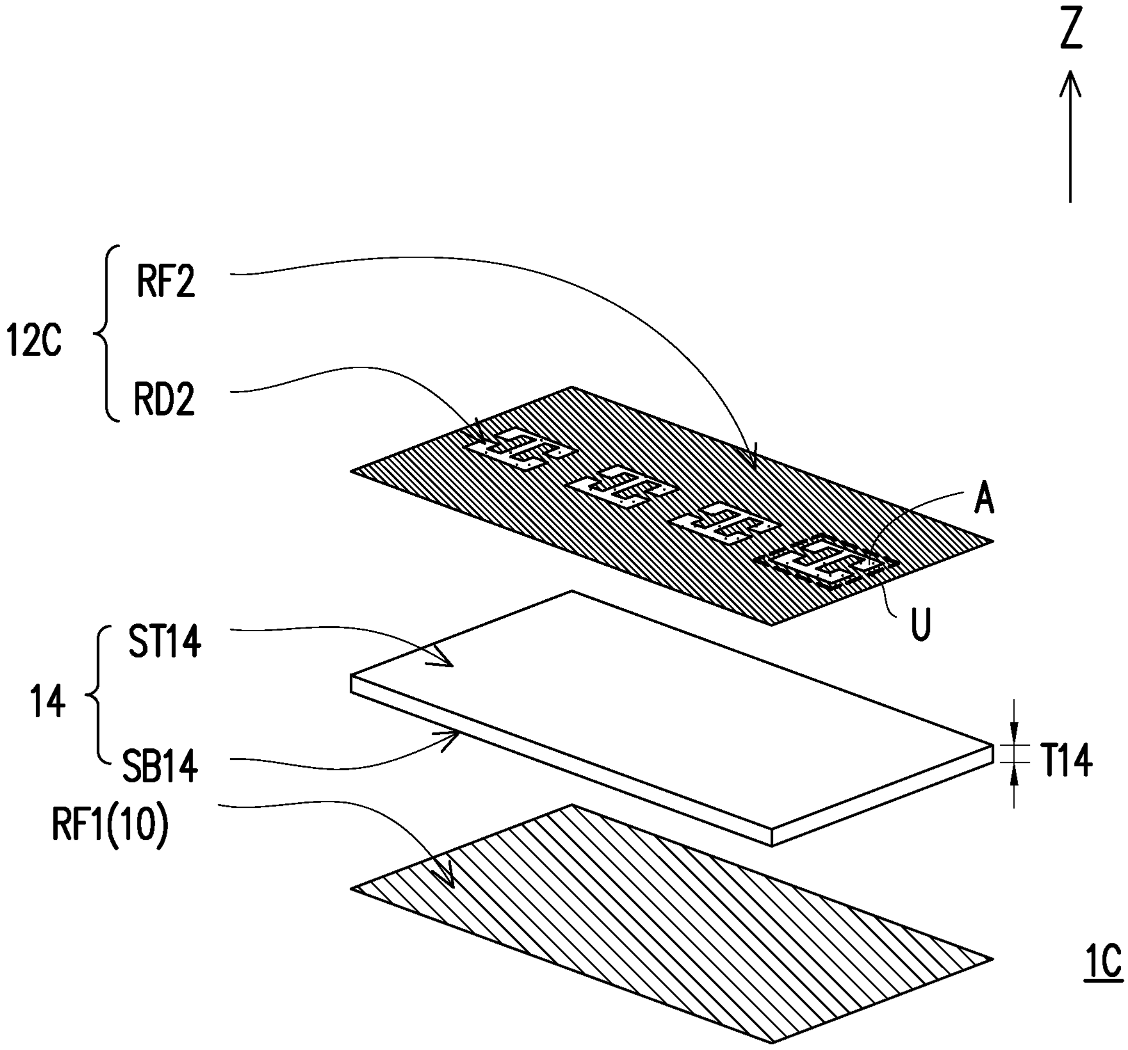

Referring to FIG. 5, an antenna device 1C is, for example, a meta-surface antenna and includes the first grid layer 10, a second grid layer 12C, and the first insulation layer 14. The main difference between the second grid layer 12C and the second grid layer 12 of FIG. 1 is that the second function region RF2 includes multiple meta-surface pattern units U. The multiple meta-surface pattern units U are arranged in an array on a plane perpendicular to the direction Z. Each meta-surface pattern unit U includes an opening A, and the second dummy region RD2 corresponds to the multiple openings A of the multiple meta-surface pattern units U.

In some embodiments, the first function region RF1 is, for example, connected to a ground signal (that is, the first function region RF1 includes a ground electrode). The first insulation layer 14 may serve as a waveguide structure for transmitting the electromagnetic waves, and the second function region RF2 may be a floating electrode; alternatively, although not shown, the first insulation layer 14 may include an tunable element to adjust the electrical signal received by the second function region RF2, so that the phase and the amplitude of the electromagnetic wave output from the opening A change accordingly (that is, the phase and/or the amplitude of the electromagnetic wave transmitted in the first insulation layer 14 is different from the phase and/or the amplitude of the electromagnetic wave output from the opening A), and the direction of the electromagnetic wave output from the antenna device 1C may be controlled or the directivity of the antenna device 1C may be improved. For the relevant details of the tunable element, reference may be made to the foregoing and the details are not repeated here. In some other embodiments, the tunable element (not shown) may be disposed on the second grid layer 12C and across the opening A, and the tunable element includes at least two pads electrically connected to the second grid layer 12C and receiving at least two potentials, but the disclosure is not limited thereto. In some embodiments, the tunable element may be across the opening A along a direction substantially parallel to the long side of the second grid layer 12C, but the disclosure is not limited thereto.

Although not shown in FIG. 5, each of the above-mentioned function regions may have multiple grid openings. For example, please refer to the design of the conduction layer MM in FIG. 2A to FIG. 2D. In addition, the above-mentioned dummy region (such as the second dummy region RD2 corresponding to the multiple openings A of the multiple meta-surface pattern units U) may also have multiple grid openings. For example, please refer to the design of the insulation layer IM, the insulation layer IM', or the conduction layer MM' in FIG. 2A to FIG. 2D and the details are not repeated here.

Figure 6:
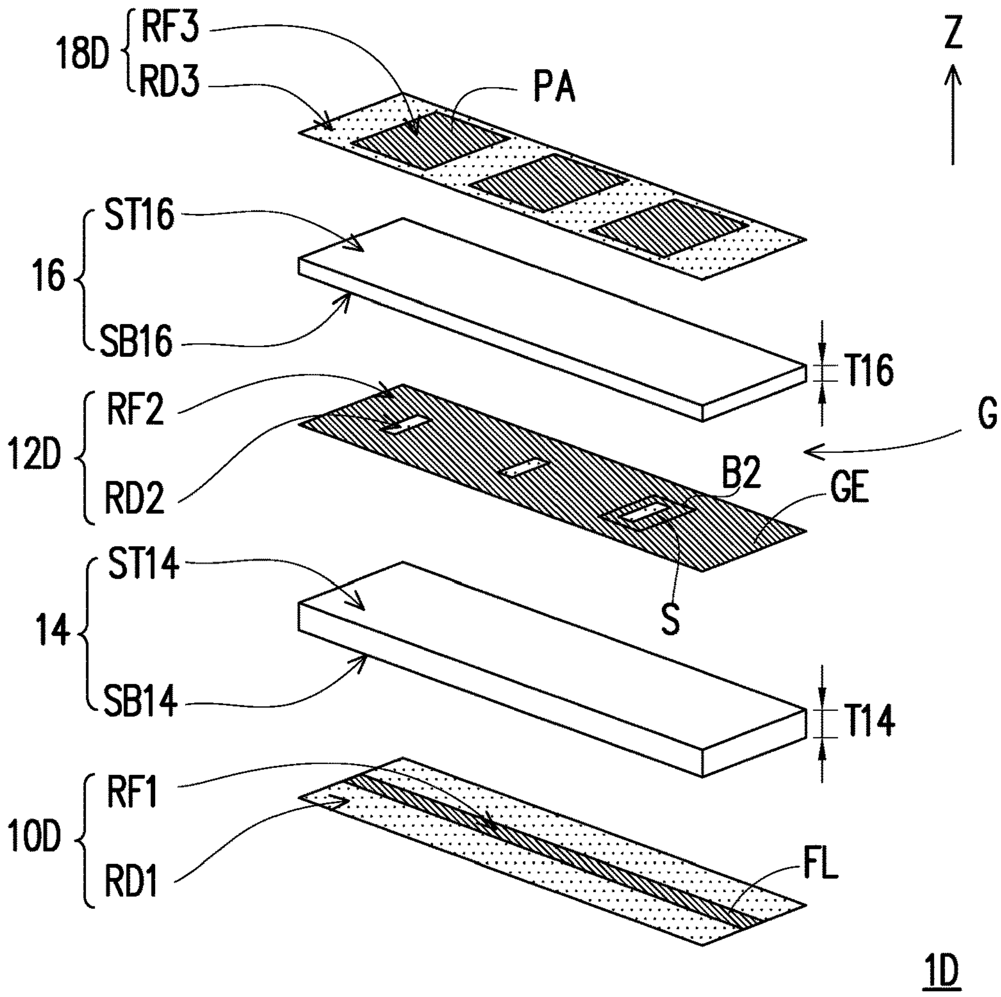
Figure 7:
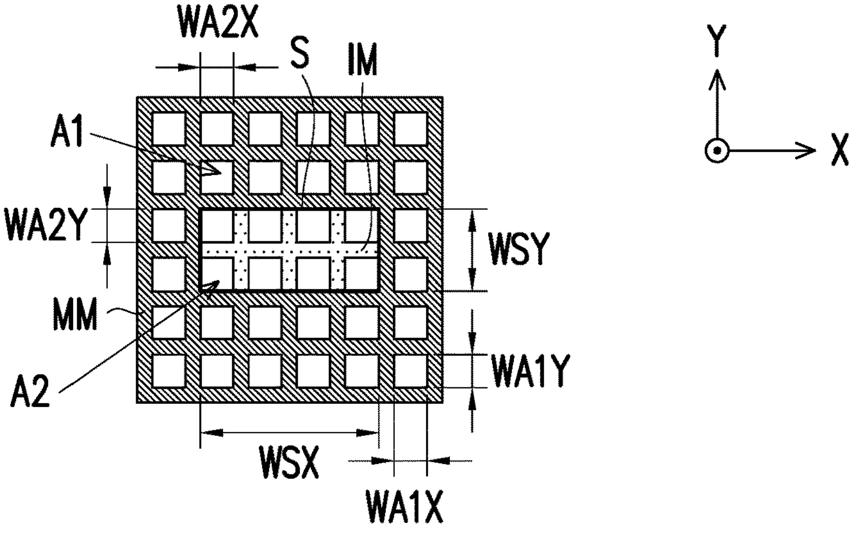
FIG. 7 is a schematic top-view diagram of a dotted frame B2 in FIG. 6.

Referring to FIG. 6 and FIG. 7, an antenna device 1D is, for example, an array antenna and includes a first grid layer 10D, a second grid layer 12D, the first insulation layer 14, the second insulation layer 16, and a third grid layer 18D. The main difference between the first grid layer 10D and the first grid layer 10 of FIG. 1 is that the first grid layer 10D also has the first dummy region RD1 electrically insulated from the first function region RF1. Furthermore, the first function region RF1 includes, for example, a feed line FL.

The main difference between the second grid layer 12D and the second grid layer 12 of FIG. 1 is that the second function region RF2 includes a ground electrode GE, and the second dummy region RD2 includes a slot S located in the ground electrode GE. The size of the slot S is more than twice the size of the grid opening (such as the grid opening A1 or the grid opening A2) of the second grid layer 12D.

In detail, the slot S is used to allow the electromagnetic wave transmitted in the first insulation layer 14 to penetrate, so that the electromagnetic wave may be transmitted upward. For example, as shown in FIG. 7, a width WA1X of the grid opening A1 in a direction X may be substantially the same as a width WA2X of the grid opening A2 in a direction X, and a width WA1Y of the grid opening A1 in a direction Y may be substantially the same as a width WA2Y of the grid opening A2 in a direction Y, but the disclosure is not limited thereto. In addition, a width WSX of the slot S in the direction X may be more than 4 times the width WA1X (or width WA2X), and a width WSY of the slot S in the direction Y may be more than 2 times the width WA1Y (or width WA2Y), but the disclosure is not limited thereto.

The main difference between the third grid layer 18D and the third grid layer 18 of FIG. 1 is that the third function region RF3 overlaps the slot S. In detail, the third function region RF3 includes, for example, multiple patch antennas PA, and the multiple patch antennas PA overlap the multiple slots S in a direction Z, respectively.

It should be understood that each function region in FIG. 6 may have multiple grid openings. For example, please refer to the design of the conduction layer MM in FIG. 2A to FIG. 2D. In addition, each dummy region (such as the first dummy region RD1 located outside the feed line FL in the first grid layer 10D, the second dummy region RD2 correspondingly disposed to the multiple slots S, or the third dummy region RD3 located outside the multiple patch antennas in the third grid layer 18D) may also have multiple grid openings. For example, please refer to the design of the insulation layer IM, insulation layer IM', or conduction layer MM' in FIG. 2A to FIG. 2D and the details are not repeated here.

Although the above-mentioned embodiments disclose that the difference in the light transmittances and/or the reflectances between the function region and the dummy region may be reduced by disposing the grid openings in the dummy region outside the function region so as to reduce the visibility of the antenna pattern (function region), the disclosure is not limited thereto. In other embodiments, by selecting appropriate materials (such as selecting materials with a specific light transmittance or reflectance) or by changing the shape, the size, the line width, or the density of the grid opening, it may enable meaningful patterns to be seen from the antenna device on the macroscopic view.

Taking an antenna device 1E of FIG. 8 as an example, if it is intended to allow the user to see a smiley face pattern on the antenna device 1E, appropriate materials may be selected for different regions (such as selecting materials with a specific light transmittance or reflectance), or the shape, the size, the line width (such as a line width W3, a line width W4, or a line width W5) or the density of the grid opening (such as a grid opening A3, a grid opening A4, or a grid opening A5) may be changed to adjust the light transmittance or the reflectance in different regions, so that the smiley face pattern may be seen from the antenna device 1E on the macroscopic view. In detail, the line width W3 of the eye region in the smiley face may be made greater than the line width of the other regions (such as line width W4 and the line width W5), so as to reduce the light transmittance of the eye region, so that the eye region is darker than the other regions (such as the face region and the mouth region). On the other hand, the size of the grid opening A5 of the face region may be made greater than the size of the grid openings of the other regions (such as the grid opening A3 and the grid opening A4), so that the face region is brighter than the other regions, but the disclosure is not limited thereto.

Figure 11:
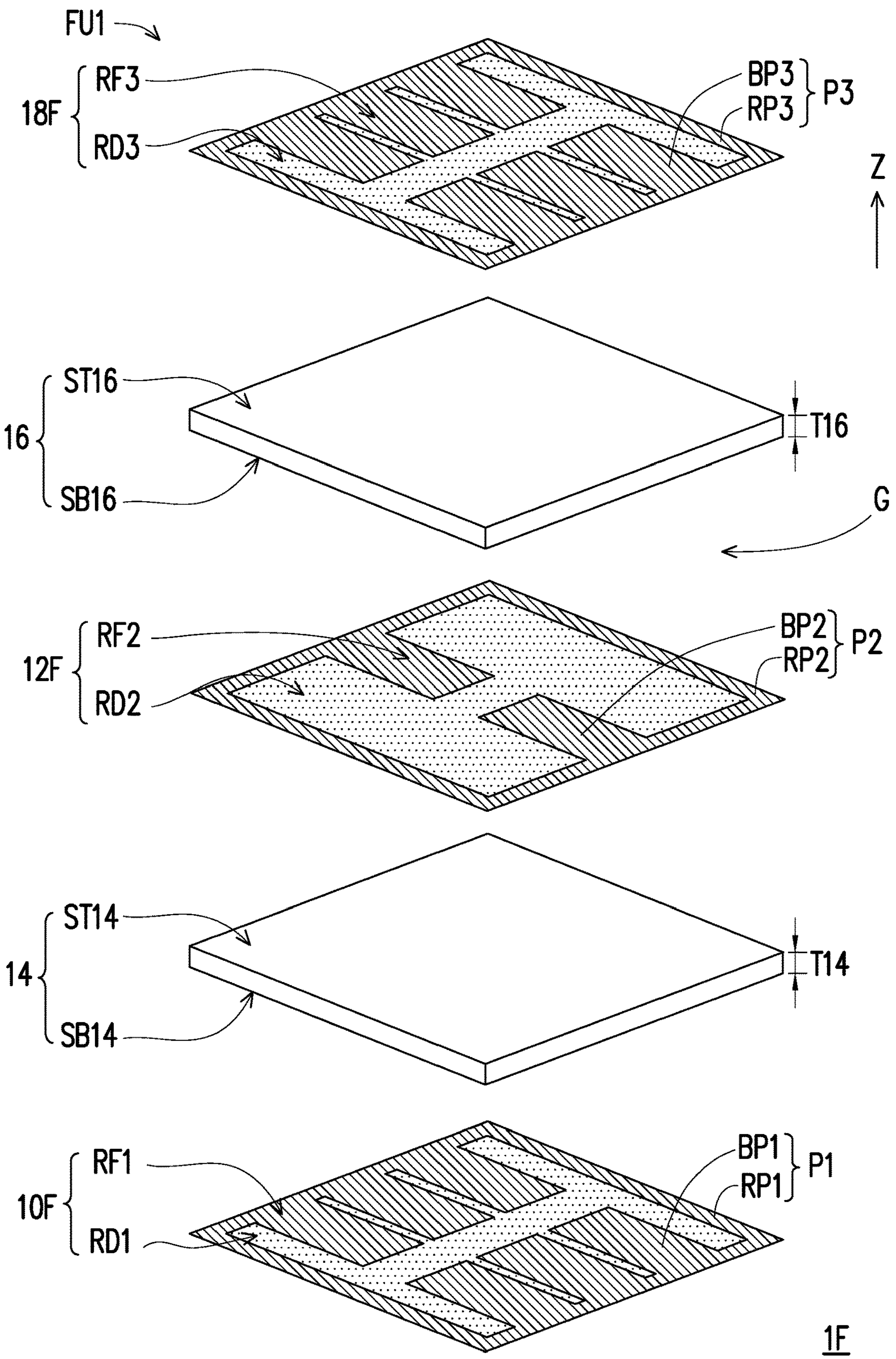

Referring to FIG. 9 to FIG. 11, an antenna device 1F is, for example, a meta-surface lens antenna and may include multiple function units, such as multiple function units FU1, multiple function units FU2, multiple function units FU3, multiple function units FU4, and multiple function units FU5, but is not limited thereto. The multiple function units FU1, the multiple function units FU2, the multiple function units FU3, the multiple function units FU4, and the multiple function units FU5 are, for example, arranged in an array on a plane formed by the direction X and the direction Y.

The antenna device 1F may include a first grid layer 10F, a second grid layer 12F, and a third grid layer 18F. The first grid layer 10F includes the first function region RF1. The first function region RF1 includes a first pattern P1. The second grid layer 12F is disposed on the first grid layer 10F and includes the second function region RF2. The second function region RF2 overlaps the first function region RF1 and includes a second pattern P2. The third grid layer 18F is disposed on the second grid layer 12F and includes the third function region RF3. The third function region RF3 overlaps the second function region RF2 and includes a third pattern P3. The third pattern P3 is the same as the first pattern P1.

As shown in FIG. 11, the first pattern P1 includes, for example, a frame pattern RP1 and multiple (e.g., six) block patterns BP1. The multiple block patterns BP1 are located in the frame pattern RP1 and connected to the frame pattern RP1. In addition, three of the six block patterns BP1 and the other three block patterns BP1 are respectively connected to two opposite inner edges of the frame pattern RP1. The second pattern P2 includes, for example, a frame pattern RP2 and multiple (e.g., two) block patterns BP2. The multiple block patterns BP2 are located in the frame pattern RP2 and connected to the frame pattern RP2. In addition, the two block patterns BP2 are respectively connected to two opposite inner edges of the frame pattern RP2, and the two block patterns BP2 overlap the two corresponding block patterns BP1 in the direction Z. The third pattern P3 includes a frame pattern RP3 and multiple (e.g., six) block patterns BP3. The multiple block patterns BP3 are located in the frame pattern RP3 and connected to the frame pattern RP3. In addition, three of the six block patterns BP3 and the other three block patterns BP3 are respectively connected to two opposite inner edges of the frame pattern RP3, and the six block patterns BP3 respectively overlaps the six block patterns BP1 in the direction Z.

In some embodiments, as shown in FIG. 11, the second pattern P2 may be different from the first pattern P1. However, in other embodiments, the second pattern P2 may be the same as the first pattern P1.

It should also be understood that the number of the block patterns in each function region may be varied according to requirements. For example, although not shown, the number of block patterns BP1 in the first function region RF1 may be four, the number of block patterns BP2 in the second function region RF2 may be six, and the number of block patterns BP3 in the third function region RF3 may be four.

Each of the first pattern P1 (including the frame pattern RP1 and the multiple block patterns BP1), the second pattern P2 (including the frame pattern RP2 and the multiple block patterns BP2), and the third pattern P3 (including the frame pattern RP3 and the multiple block patterns BP3) may have multiple grid openings. For example, please refer to the design of the conduction layer MM in FIG. 2A to FIG. 2D and the details are not repeated here.

In addition, the first grid layer 10F may further include the first dummy region RD1 located outside the first pattern P1. The second grid layer 12F may further include the second dummy region RD2 located outside the second pattern P2, and the third grid layer 18F may further include the third dummy region RD3 located outside the third pattern P3. The above-mentioned dummy regions may also have multiple grid openings. For example, please refer to the design of the insulation layer IM, the insulation layer IM', or the conduction layer MM' in FIG. 2A to FIG. 2D and the details are not repeated here.

The antenna device 1F may further include the first insulation layer 14 and the second insulation layer 16. The first insulation layer 14 is disposed between the first grid layer 10F and the second grid layer 12F, and the second insulation layer 16 is disposed between the second grid layer 12F and the third grid layer 18F. For the details about the first insulation layer 14 and the second insulation layer 16, reference may be made to the foregoing and the details are not repeated here.

By using the grid layer instead of the continuous conduction layer to form the antenna pattern, it may help to reduce the visibility of the antenna pattern. In addition, by disposing the grid pattern in the region outside the function region (dummy region), the difference in the light transmittances and/or the reflectances between the function region and the dummy region may be further reduced, which helps to improve the appearance quality of the antenna device 1F.

Referring to FIG. 10 and FIG. 11, the function unit FU2 is similar to the function unit FU1. The main difference between the two lies in the number of block patterns in each function region. In some embodiments, at least two of the first pattern, the second pattern, and the third pattern may completely overlap. For example, in the function unit FU2, the number of block patterns BP1 in the first function region RF1 may be six, the number of block patterns BP2 in the second function region RF2 may be zero (that is, the second function region RF2 includes only the frame pattern RP2), and the number of block patterns BP3 in the third function region RF3 may be six. Alternatively, in the function unit FU2, the number of block patterns BP1 in the first function region RF1 may be six, the number of block patterns BP2 in the second function region RF2 may be six, and the number of block patterns BP3 in the third function region RF3 may be three. Alternatively, in the function unit FU2, the number of block patterns BP1 in the first function region RF1 may be six, the number of block patterns BP2 in the second function region RF2 may be six, and the number of block patterns BP3 in third function region RF3 may be six.

The function unit FU3 is similar to the function unit FU2. The main difference between the two lies in the length of the block pattern. Specifically, the block pattern in the function unit FU3 is, for example, shorter than the block pattern in the function unit FU2. The function unit FU4 is similar to the function unit FU3. The main difference between the two lies in the length of the block pattern. Specifically, the block pattern in the function unit FU4 is, for example, shorter than the block pattern in the function unit FU3.

The function unit FU5 is similar to the function unit FU1. The main difference between the two is that the number of block patterns BP2 in the second function region RF2 of the function unit FU5 is zero (that is, the second function region RF2 only includes the frame pattern RP2). For example, in the function unit FU2, the number of block patterns BP1 in the first function region RF1 may be four, the number of block patterns BP2 in the second function region RF2 may be zero, and the number of block patterns BP3 in the third function region RF3 may be four.

In summary, in the embodiments of the disclosure, the grid layer is used instead of the continuous conduction layer to form the antenna pattern, which helps to reduce the visibility of the antenna pattern. In addition, by disposing the grid pattern in the region outside the function region (dummy region), the difference in the light transmittances and/or the reflectances between the function region and the dummy region may be further reduced, which helps to improve the appearance quality of the antenna device.

The above embodiments are only used to illustrate, but not to limit, the technical solution of the disclosure. Although the disclosure has been described in detail with reference to the above embodiments, persons skilled in the art should understand that the technical solutions described in the above embodiments may still be modified or some or all of the technical features thereof may be equivalently replaced. However, these modifications or replacements do not cause the essence of the corresponding technical solutions to depart from the scope of the technical solutions of the embodiments of the disclosure.

Although the embodiments of the disclosure and the advantages thereof have been disclosed above, it should be understood that any person skilled in the art may make changes, substitutions, and modifications without departing from the spirit and scope of the disclosure, and the features of each embodiment may be arbitrarily mixed and replaced with each other to form other new embodiments. In addition, the protection scope of the disclosure is not limited to the processes, machines, manufactures, material compositions, devices, methods, and steps in the specific embodiments described in the specification, and any person skilled in the art may learn from the content of the disclosure the current or future developed processes, machines, manufactures, material compositions, devices, methods, and steps which may be used according to the disclosure as long as they may perform substantially the same function or obtain substantially the same results in the embodiments described herein. Therefore, the protection scope of the disclosure includes the above processes, machines, manufactures, material compositions, devices, methods, and steps. In addition, each claim constitutes an individual embodiment, and the protection scope of the disclosure also includes combinations of the individual claims and the embodiments. The protection scope of the disclosure shall be defined by the appended claims.

What is claimed is:

1. An antenna device, comprising:

a first grid layer, having a first function region;

a second grid layer, having a second function region and a second dummy region electrically insulated from the second function region;

a first insulation layer, disposed between the first grid layer and the second grid layer, wherein the first function region overlaps the second function region;

a second insulation layer, disposed on the second grid layer; and a third grid layer, disposed on the second insulation layer, and having a third function region and a third dummy region electrically insulated from the third function region, wherein the third function region overlaps the second function region.

2. The antenna device according to claim 1, wherein a thickness of the first insulation layer is greater than a thickness of the second insulation layer.

3. The antenna device according to claim 1, wherein the first grid layer further has a first dummy region electrically insulated from the first function region.

4. The antenna device according to claim 3, wherein the second function region comprises a ground electrode, the second dummy region comprises a slot in the ground electrode, and a size of the slot is more than twice a size of a grid opening of the second grid layer.

5. The antenna device according to claim 4, wherein the third function region overlaps the slot.

6. The antenna device according to claim 4, wherein the first function region comprises a feed line, and the third function region comprises a plurality of patch antennas.

7. The antenna device according to claim 3, wherein the first function region comprises a plurality of first ring-shaped electrodes and a plurality of first block-shaped electrodes respectively located in the plurality of first ring-shaped electrodes, the second function region comprises a plurality of second ring-shaped electrodes and a plurality of second block-shaped electrodes respectively located in the plurality of second ring-shaped electrodes, and the third function region comprises a plurality of third ring-shaped electrodes and a plurality of third block-shaped electrodes respectively located in the plurality of third ring-shaped electrodes.

8. The antenna device according to claim 1, wherein there is a gap between the second insulation layer and the second grid layer.

9. The antenna device according to claim 1, wherein the first function region comprises a ground electrode, the second function region comprises a patch antenna and a feed line, and the third function region comprises a parasitic patch antenna.

10. The antenna device according to claim 1, wherein the first function region comprises a ground electrode, and the second function region comprises a plurality of ring-shaped electrodes and a plurality of block-shaped electrodes respectively located in the plurality of ring-shaped electrodes.

11. The antenna device according to claim 1, wherein the second grid layer comprises a conduction layer having a plurality of grid openings and an insulation layer having a plurality of grid openings, the conduction layer having the plurality of grid openings is disposed in the second function region, the insulation layer having the plurality of grid openings is disposed in the second dummy region, and the conduction layer and the insulation layer do not overlap each other and are in contact with each other.

12. The antenna device according to claim 11, wherein a size and a line width of the plurality of grid openings in the second function region are greater than a size and a line width of the plurality of grid openings in the second dummy region.

13. The antenna device according to claim 1, wherein the second grid layer comprises a first conduction layer having a plurality of grid openings and a second conduction layer having a plurality of grid openings, the first conduction layer having the plurality of grid openings is disposed in the second function region, the second conduction layer having the plurality of grid openings is disposed in the second dummy region, and the first conduction layer and the second conduction layer do not overlap each other and are not in contact with each other.

14. An antenna device, comprising:

a first grid layer, having a first function region;

a second grid layer, having a second function region and a second dummy region electrically insulated from the second function region;

a first insulation layer, disposed between the first grid layer and the second grid layer, wherein the first function region overlaps the second function region, wherein the second grid layer comprises a conduction layer having a plurality of grid openings and an insulation layer having a plurality of grid openings, the conduction layer having the plurality of grid openings is disposed in the second function region, the insulation layer having the plurality of grid openings is disposed in the second function region and the second dummy region, and the conduction layer and the insulation layer overlap each other and are in contact with each other.

15. An antenna device, comprising:

a first grid layer, comprising a first function region, wherein the first function region comprises a first pattern;

a second grid layer, disposed on the first grid layer, and comprising a second function region, wherein the second function region overlaps the first function region and comprises a second pattern; and a third grid layer, disposed on the second grid layer, and comprising a third function region, wherein the third function region overlaps the second function region and comprises a third pattern, and the third pattern is the same as the first pattern.

16. The antenna device according to claim 15, wherein the second pattern is different from the first pattern.

17. The antenna device according to claim 15, wherein the second pattern is the same as the first pattern.

18. The antenna device according to claim 15, further comprising:

a first insulation layer, disposed between the first grid layer and the second grid layer; and a second insulation layer, disposed between the second grid layer and the third grid layer.

* * * * *